US010061924B1

(12) United States Patent
Gupta

(10) Patent No.: US 10,061,924 B1
(45) Date of Patent: Aug. 28, 2018

(54) DETECTING MALICIOUS CODE BASED ON DEVIATIONS IN EXECUTABLE IMAGE IMPORT RESOLUTIONS AND LOAD PATTERNS

(71) Applicant: Symantec Corporation, Mountain View, CA (US)

(72) Inventor: Prashant Gupta, Gloucester (GB)

(73) Assignee: Symantec Corporation, Mountain View, CA (US)

( * ) Notice: Subject to any disclaimer, the term of this patent is extended or adjusted under 35 U.S.C. 154(b) by 107 days.

(21) Appl. No.: 14/986,362

(22) Filed: Dec. 31, 2015

(51) Int. Cl.
*G06F 11/00* (2006.01)
*G06F 21/56* (2013.01)

(52) U.S. Cl.
CPC ...... *G06F 21/566* (2013.01); *G06F 2221/033* (2013.01)

(58) Field of Classification Search
CPC .................................................. G06F 21/566
USPC ........................................................ 726/23
See application file for complete search history.

(56) References Cited

U.S. PATENT DOCUMENTS

| 9,519,781 | B2* | 12/2016 | Golshan | .................. G06F 21/53 |
| 2008/0077995 | A1* | 3/2008 | Curnyn | ............... H04L 63/1416 |
| | | | | 726/27 |
| 2012/0255017 | A1* | 10/2012 | Sallam | .................. G06F 21/575 |
| | | | | 726/24 |

* cited by examiner

*Primary Examiner* — Christopher J Brown
(74) *Attorney, Agent, or Firm* — Patent Law Works LLP

(57) ABSTRACT

Trusted executable images are run in a controlled environment, such as a dynamic malware analysis platform. For each trusted executable image, a corresponding baseline import-load signature is generated. This can be done by applying a cryptographic hash function to the specific instructions which resolve imports and/or load libraries, and their operands. Sample programs are run in the controlled environment and tested for maliciousness. Any executable image run by a given sample program in the controlled environment is identified, and an import-load signature of the executable image when run by the sample program is generated. The import-load signature of the executable image when run by the sample program is compared to the corresponding stored baseline import-load signature for the same executable image. The sample program is adjudicated as being benign or malicious based on at least the results of the comparison.

18 Claims, 3 Drawing Sheets

DETECTING MALICIOUS CODE BASED ON DEVIATIONS IN EXECUTABLE IMAGE IMPORT RESOLUTIONS AND LOAD PATTERNS

TECHNICAL FIELD

This disclosure pertains generally to computer security, and more specifically to detecting malicious code that modifies an in-memory process, based on deviations in executable image import resolutions and load patterns.

BACKGROUND

With the large volume of malware (e.g., viruses, worms, Trojans, etc.) in circulation, anti-malware software is an important line of defense for computer systems. One avenue of attack used by some malware is for a malicious process to inject malicious code into an in-memory process on the target computer. In other words, rather than infecting a file on the disk of the target computer, the malware infects a process that has been loaded into the memory of the target computer from a local file. This technique enables the malware to infect the target computer without the malware itself having an on-disk presence. Since a lot of anti-malware technology works by scanning files for malware signatures, malicious code that does not reside in a file on disk is difficult to detect. Making it even harder to detect such malware, the malicious process does not always infect a process that is already in memory, but instead loads into memory an executable image from the disk, e.g., a Portable Executable ("PE") file in the case of Windows, an Executable and Linkable Format file ("ELF") in the case of Unix-line operating systems, etc. The malicious process then adds malicious code, or replaces existing code with malicious code, thereby infecting the target in-memory process.

Attempts to detect this type of attack have generally taken the form of tracking behaviors of programs, and trying to identify those considered to be indicative of suspicious in-memory process modification. A program that engages in a requisite amount of such behavior can then adjudicated as being potentially malicious. However, malware authors intentionally evade such detection techniques, by obfuscating, modifying and/or avoiding behaviors that are considered indicative of malicious in-memory image modification.

It would be desirable to address these issues.

SUMMARY

Malicious code that modifies an in-memory process is detected, based on deviations in executable image import resolutions and load patterns. Trusted executable images are run in a controlled environment. These are images present on-disk within the controlled environment, and known not to be infected with malicious code. The controlled environment can be in the form of a fixed execution platform for analysis of running processes, such as a dynamic malware analysis platform. When each trusted executable image is run in the controlled environment, a corresponding baseline import-load signature is generated, and stored in a database or other suitable storage mechanism. Generating an import-load signature can take the form of generating a unique binary signature of the resolution of imports and/or the loading of libraries by the executable image when it is loaded into memory and run. This can be done, for example, by applying a cryptographic hash function to specific instructions of the executable image and their operands (e.g., the specific instructions which resolve imports and/or load libraries).

One or more sample programs are run in the controlled environment and tested for maliciousness. These sample programs can be gleaned from live streams or other sources in the wild. Any executable image run by a given sample program in the controlled environment is identified, and an import-load signature of the executable image when run by the sample program is generated. The import-load signature of the executable image when run by the sample program is compared to the corresponding stored baseline import-load signature for the same executable image. The sample program is adjudicated as being benign or malicious based on at least the results of the comparison.

The sample program can be adjudicated as being benign if there is no difference between the import-load signature of the specific executable image when run by the sample program and the corresponding stored baseline import-load signature for the same specific executable image. On the other hand, a difference between these signatures indicates that the sample program modified the executable image. In one embodiment, this can be enough to adjudicate the sample program as being malicious. In other embodiments, such a difference between the signatures is only one of multiple evidentiary factors used to determine whether a given suspiciousness threshold is met by the sample program. For example, in such embodiments the code imported or loaded by the executable image when run by the sample program can be analyzed for maliciousness.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
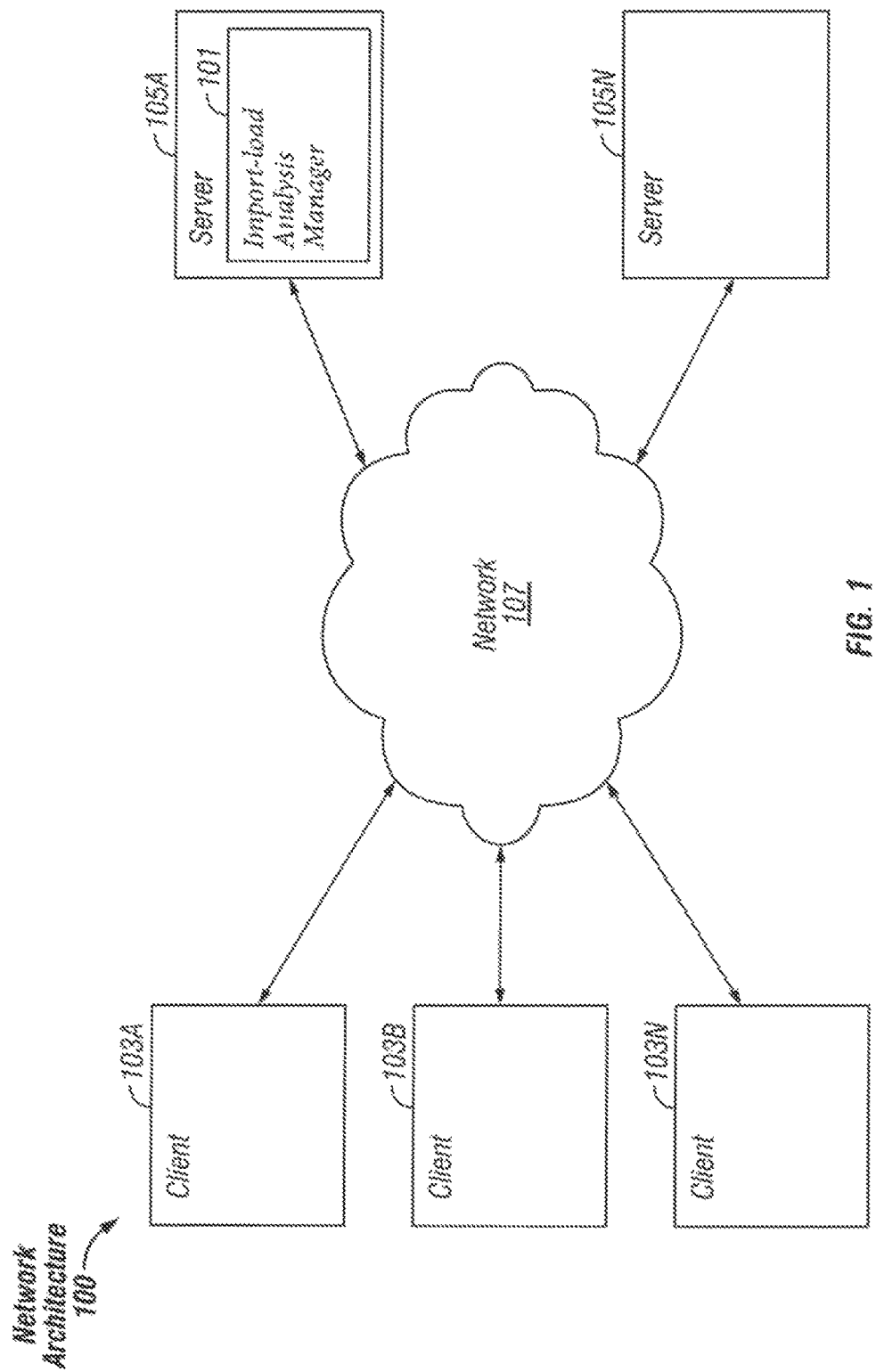
FIG. 1 is a block diagram of an exemplary network architecture in which an import-load analysis manager can be implemented, according to some embodiments.

FIG. 1 is a block diagram illustrating an exemplary network architecture 100 in which an import-load analysis manager 101 can be implemented. The illustrated network architecture 100 comprises multiple clients 103A, 103B and 103N, as well as multiple servers 105A and 105N. In FIG.

1, the import-load analysis manager 101 is illustrated as residing on server 105A. It is to be understood that this is an example only, and in various embodiments various functionalities of this system 101 can be distributed between multiple computing devices 210 as desired.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Examples of mobile computing devices are smartphones, tablets, wearable devices such as smart watches, laptop computers, etc.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
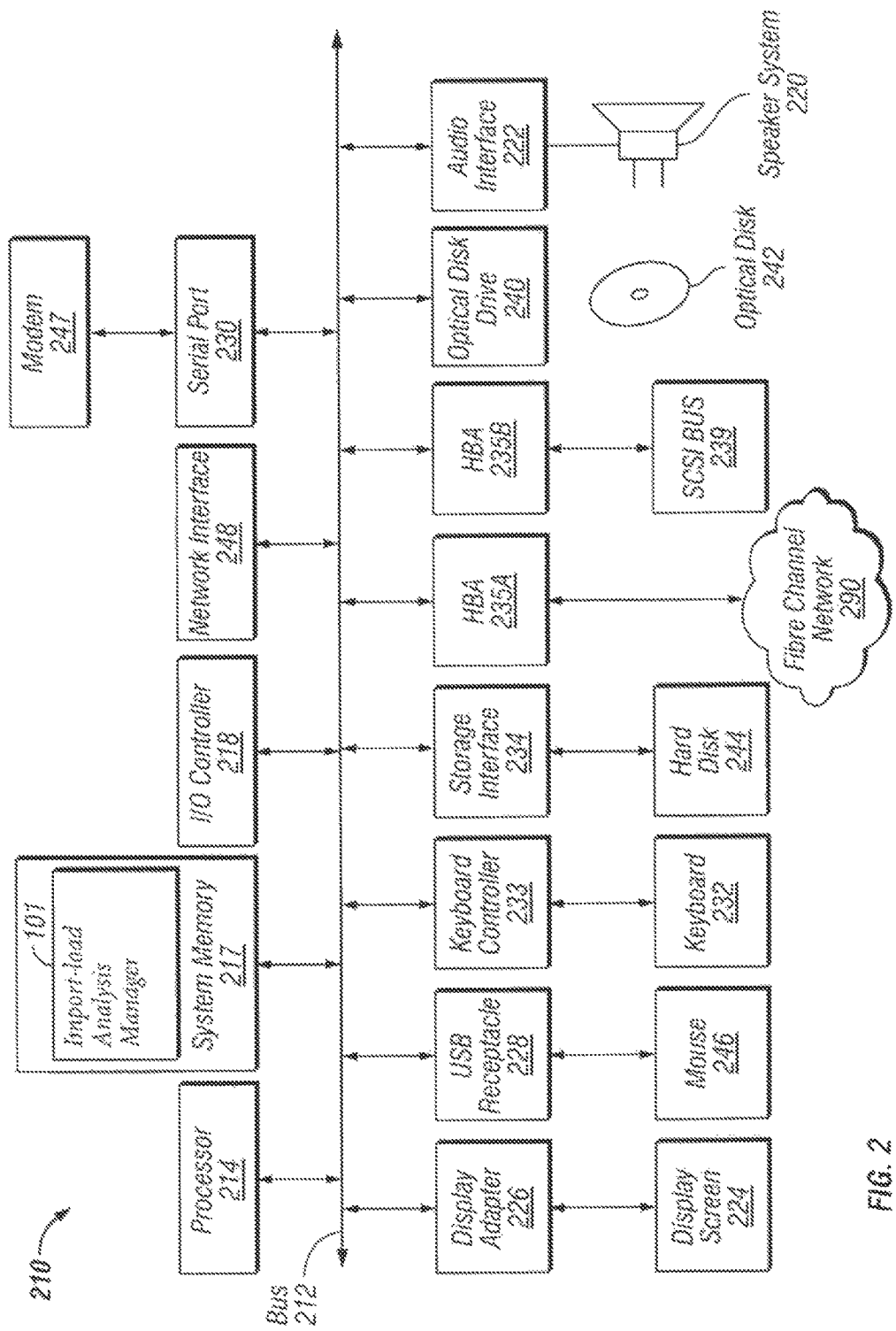
FIG. 2 is a block diagram of a computer system suitable for implementing an import-load analysis manager, according to some embodiments.

FIG. 2 is a block diagram of a computer system 210 suitable for implementing an import-load analysis manager 101. Clients 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 241, flash memory) and loaded into system memory 217 and executed by the processor 214. Application programs can also be loaded into system memory 217 from a remote location (i.e., a remotely located computer system 210), for example via the network interface 248. In FIG. 2, the import-load analysis manager 101 is illustrated as residing in system memory 217. The workings of the import-load analysis manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
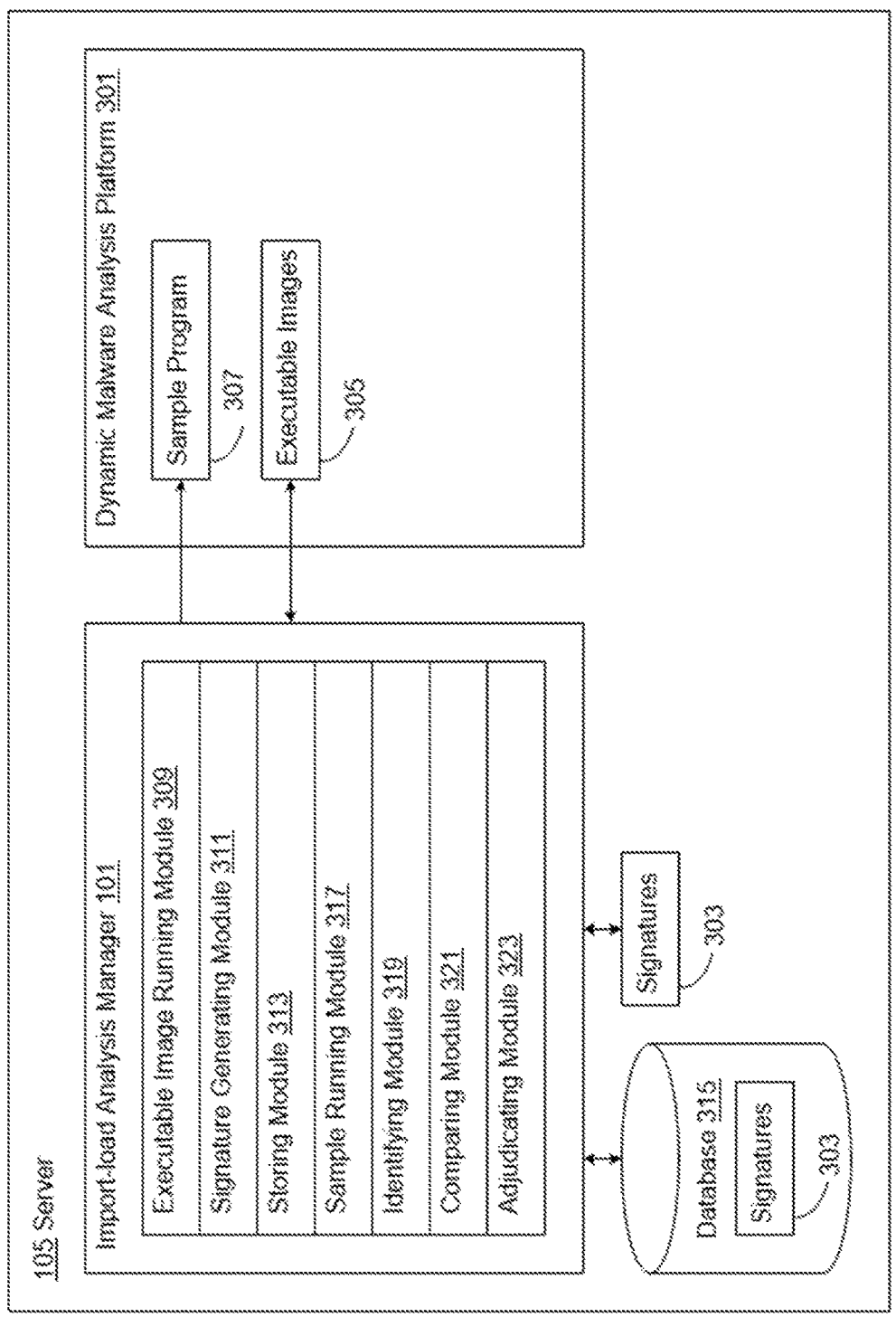
FIG. 3 is a high level block diagram of the operation of an import-load analysis manager, according to some embodiments.

FIG. 3 illustrates the operation of an import-load analysis manager 101 running on a server 105. As described above, the functionalities of the import-load analysis manager 101 can reside on specific computers 210 or be otherwise distributed between multiple computer systems 210, including within a fabric/cloud-based computing environment in which the functionality of the import-load analysis manager 101 is provided as a service over a network 107. It is to be understood that although the import-load analysis manager 101 is illustrated in FIG. 3 as a single entity, the illustrated import-load analysis manager 101 represents a collection of functionalities, which can be instantiated as a single or multiple modules as desired (instantiation of a specific, multiple module import-load analysis manager 101 is illustrated in FIG. 3). It is to be understood that the modules of the import-load analysis manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client computer," "server computer" and "computing device" mean one or more computers configured and/or programmed to execute the described functionality. Additionally, program code to implement the functionalities of the import-load analysis manager 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

As illustrated in FIG. 3, the import-load analysis manager 101 runs on a server 105 in conjunction with a dynamic malware analysis platform 301. A dynamic malware analysis platform is a controlled backend environment in which code, including suspected or known malicious code, can be executed and analyzed without risk to production systems. Although the import-load analysis manager 101 and the dynamic malware analysis platform 301 are both illustrated as residing on a single server 105, in practice these components represent collections of functionalities which can be distributed across multiple servers 105 and/or other computing devices 210 and provided as cloud based services. It is also to be understood that the dynamic malware analysis platform 301 and the import-load analysis manager 101 can, but need not, operate in conjunction with a more comprehensive anti-malware software platform (not specifically illustrated), in which a variety of tools are used to detect, protect against and otherwise manage malware.

The import-load analysis manager 101 is able to detect infections of in-memory processes by malicious code without having to monitor and track behaviors of running programs. Instead, as described in detail below, the import-load analysis manager 101 runs trusted executable images 305 under trusted circumstances (e.g., in the dynamic malware analysis platform 301), and generates signatures 303 of their loads and imports (an import-load signature 303). These import-load signatures 303 serve as a baseline of what loading and importing of external code is to be expected when specific benign executable images 305 are run. Any deviations are detected between these baseline import-load signatures 303 and import-load signatures 303 generated when the executable images 305 are run by sample programs 307 gleaned from real traffic streams and the like (i.e., "in the wild"). In other words, sample programs 307 are tested in the same controlled environment in which the baseline signatures 303 were established, and import-load signatures 303 are generated for any executable images 305 run by the samples 307. If the import-load signature 303 for a given executable image 305 run by the sample 307 is different than the corresponding expected baseline import-load signature 303, this indicates that the sample 307 modified the executable image 305 after launching it, which is indicative of maliciousness.

As described below, the sample 307 can be convicted as malicious based on this deviation between the expected and actual load-import signatures 303 of the executable image 305, or the deviation can be considered one of multiple evidentiary factors in a conviction analysis (the actual code loaded and/or imported can be analyzed in this context). Note that the import-load analysis manager 101 is agnostic to the way in which the sample 307 achieved its modification of the running executable image 305, and does not need to monitor the behavior of the sample 307 while it is running to attempt to detect suspicious behaviors.

Describing the above-referenced functionality in greater detail, an executable image running module 309 of the import-load analysis manager 101 runs trusted executable images 305 in a controlled environment. In on embodiment the controlled environment is in the form of the dynamic malware analysis platform 301 as illustrated in FIG. 3, but in other embodiments other environments can be used as desired. A controlled environment allows for a fixed execution platform for analysis of running processes, which can be reset before running each executable image 305 (or sample program 307 as described below). The specific trusted executable images 305 run by the executable image running module 309 can vary between embodiments. It is to be understood that the trusted executable images 305 are known benign images 305 that are present on-disk within the controlled environment (e.g., PE images under Windows, ELF images under Unix-like operating systems, etc.). These executable images 305 are of interest in the context of the import-load analysis manager 101 because they are potential targets for malicious processes to load from disk, run, and inject with malicious code. As the term is used herein "trusted" executable image 305 means that the on-disk executable image 305 in question is known to not be infected with malicious code.

When each specific one of the trusted images 305 is run, a signature generating module 311 of the import-load analysis manager 101 generates a corresponding import-load signature 303. The import load-signature 303 is a unique binary signature of the resolution of imports and/or the loading of libraries, by the executable image 305 when it is loaded into memory and run. In some embodiments, the signature generating module 311 generates an import-load signature 303 by applying a cryptographic hash function (e.g., SHA-256 or one of the other members of the SHA-2 family) to N instructions of the executable image 305 and their operands, the N instructions being those which resolve imports and load libraries. In other words, the import and/or load instructions and their operands are the input to the cryptographic hash function, and the digest is the import-load signature 303. The exact input to use can vary between embodiments and executable image formats and the like, but the idea is to create a unique binary signature 303 of the resolutions of imports and/or loading of libraries by the trusted executable image 305 being run. Additionally, different cryptographic hash functions can be used in different embodiments (e.g., SHA-2, SHA-1, MD5, etc.). In some embodiments, import-load signatures 303 are generated using techniques other than cryptographic hash functions, such as checksum algorithms. By generating a unique import-load signature 303 for each trusted executable image 305 as it is run in the trusted environment, a baseline is established of expected import resolutions and load patterns for the trusted images in the controlled environment. As described below, these baseline signatures 303 can be used to detect any deviation in imports or loads of external code when these same executable images 305 are run by sample programs 307 being tested for maliciousness. A storing module 313 of the import-load analysis manager 101 stores the generated baseline import-load signatures 303 of the trusted executable images 305 in a signature database 315 or other suitable storage mechanism.

A sample running module 317 of the import-load analysis manager 101 runs sample programs 307 being tested for maliciousness in the same controlled environment in which the trusted executable images 303 were run (e.g., the dynamic malware analysis platform 301 as illustrated in FIG. 3). The sample programs 307 are gleaned from real traffic streams or other sources "in the wild," and run in the controlled environment to be tested for maliciousness. As noted above, the execution analysis platform 301 (or other controlled environment) can be reset for each sample program 307 that is run.

When a given sample program 307 is run in the controlled environment, an identifying module 319 of the import-load analysis manager 101 identifies any executable images 305 in the controlled environment that are run by the sample program 307. When an executable image 305 is identified as being run by the sample program 307, the signature generating module 311 generates an import-load signature 303. The import-load signature for the executable image 305 run by the sample program 307 pertains to the import resolutions and loading of external code as performed by the executable image 305 when it was run by the sample program 305, as opposed to the baseline signature 303 for the same executable image 303 when it was run in a trusted scenario known to be benign.

A comparing module 321 of the import-load analysis manager 101 compares the import-load signature for the executable image 305 as run by the sample program 307 to the corresponding baseline import-load signature 303 for the same executable image 305. Based on the results of the comparison, an adjudicating module 323 of the import-load analysis manager 101 adjudicates the sample program 307 as being benign or malicious. Note that if the signatures 303 do not match, then it is known that there is a difference in the executable image's import resolutions and load pattern when run by the sample program 307. Recall that the specific executable image 305 is run in the same controlled environment when it is run by the sample program 307 as when it was previously run in a known benign scenario to create the baseline signature 303, so absent a deviation in imported and/or loaded code, the signatures 303 should match.

If there is no difference between the baseline import-load signature 303 and the one generated when the same executable image was run by the sample program 307, the adjudicating module 323 adjudicates the sample program 307 as being benign. Where a difference between the two signatures 303 is detected, the adjudicating module 323 can adjudicate the sample program 307 as being malicious. The import resolutions and/or load patterns of the executable image 305 when run by the sample program 305 being different from the expected baseline is evidence that the sample program 307 modified the executable image 305 through code injection. In one embodiment, the deviation in import resolutions/load patterns evidenced by the difference in signatures 303 is enough to convict the sample 307 as being malicious. In other embodiments, a given suspiciousness threshold is utilized by the adjudicating module 323, and the deviation between signatures 303 is one factor in a maliciousness adjudication analysis. In this context, the code that was actually imported and loaded by the executable image 305 when run by the sample program 305 can be analyzed for potential maliciousness. The analysis of this code can be at any level (e.g., scanning for signatures of known malware, heuristic analysis, hygienic analysis, etc.). Other suspicious factors concerning the sample program 307 can be taken into account as well. What specific suspiciousness threshold to use, as well as what evidentiary factors to take into account in the maliciousness adjudication analysis and how to weight these different factors, are variable design parameters.

A specific example is now provided to further illustrate the operation of the import-load analysis manager 101. Within the .NET Framework under Windows, RegAsm.exe is an assembly registration tool that reads the metadata within an assembly and adds the necessary entries to the registry, which allows COM clients to create .NET Framework classes. Thus, in an example embodiment under Windows, the executable image running module 309 runs the trusted RegAsm.exe executable image 305 in the dynamic malware analysis platform 301, and the signature generating module 311 generates a baseline import-load signature 303, which the storing module 313 stores in the signature database 315. RegAsm.exe is a .NET executable, and does not have any VB6 static imports.

The sample running module 317 runs a specific sample program 307 which was obtained in the wild in the dynamic malware analysis platform 301 to test the sample program 307 for maliciousness. When the sample program 307 runs it launches RegAsm.exe, which is identified by the identifying module 319. In response, the signature generating module 311 generates an import-load signature 303 for RegAsm.exe as run by the sample program 307, and the comparing module 321 compares this signature to the RegAsm.exe baseline signature 303. In this example scenario, the sample program 307 injects malicious code into the in-memory image of RegAsm.exe, causing RegAsm.exe to import static functions from MSVBVM60.DLL, the Visual basic virtual machine dynamic link library, which enables Windows to run Visual Basic applications. Thus, the import-load signature 303 for RegAsm.exe when it is run by the sample program 307 differs from the baseline import-load signature 303 for RegAsm.exe, and this is detected by the comparing module 321. The adjudicating module 323 analyzes the code imported by RegAsm.exe under the sample program 307 and adjudicates the sample program as being malicious, based on the difference between and signatures 303 and the analysis of the imported code.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for detecting malicious code that modifies an in-memory process, based on deviations in executable image import resolutions and load patterns, the method comprising:
running, by a computer, each one of a plurality of trusted executable images in a controlled environment;
generating, by the computer, a baseline import-load signature of each one of the plurality of trusted executable images when run in the controlled environment, wherein a baseline import-load signature of a specific trusted executable image comprises a unique binary signature of a resolution of importing external code and loading external code libraries by the specific trusted executable image when run in the controlled environment;
storing, by the computer, the generated baseline import-load signatures;
running, by the computer, a sample program being tested for maliciousness in the controlled environment;
identifying, by the computer, the sample program running a specific executable image in the controlled environment;
generating, by the computer, an import-load signature of the specific executable image, wherein the import load signature of the specific executable image comprises a unique binary signature of a resolution of importing external code and loading external code libraries, by the specific executable image when run by the sample program;
comparing, by the computer, the import-load signature of the specific executable image when run by the sample program to a corresponding stored baseline import-load signature for the same specific executable image; and adjudicating, by the computer, the sample program as being benign or malicious based on at least results of the comparison.

2. The method of claim 1 wherein the controlled environment comprises:
a fixed execution platform for analysis of running processes, which can be reset before running each item.

3. The method of claim 1 wherein the controlled environment comprises:
a dynamic malware analysis platform.

4. The method of claim 1 wherein a trusted executable image further comprises:
an image that is present on-disk within the controlled environment, the image being known not to be infected with malicious code.

5. The method of claim 1 wherein running each one of a plurality of trusted executable images in a controlled environment further comprises:
resetting the controlled environment before running each specific one of the plurality of executable images.

6. The method of claim 1 wherein running a trusted executable image in the controlled environment further comprises:
loading the trusted executable image from disk into memory and executing it in the controlled environment.

7. The method of claim 1 wherein generating an import-load signature of an executable image further comprises:
applying a cryptographic hash function to specific instructions of the executable image and their operands, the specific instructions being those which resolve imports and/or load libraries.

8. The method of claim 1 wherein running a sample program being tested for maliciousness in the controlled environment further comprises:
running a sample program gleaned from a live stream.

9. The method of claim 1 wherein running a sample program being tested for maliciousness in the controlled environment further comprises:
running a sample program to determine whether the sample program injects malicious code into a running process.

10. The method of claim 1 wherein running a sample program being tested for maliciousness in the controlled environment further comprises:
running a plurality of sample programs in the controlled environment, and testing each specific one of the plurality of samples programs for maliciousness.

11. The method of claim 10 wherein running a plurality of sample programs in the controlled environment and testing each specific one of the plurality of samples programs for maliciousness further comprises:
resetting the controlled environment before running each specific one of the plurality of sample programs.

12. The method of claim 1 wherein adjudicating the sample program as being benign or malicious based on at least results of the comparison further comprises:
adjudicating the sample program as being benign, responsive to there being no difference between the import-load signature of the specific executable image when run by the sample program and the corresponding stored baseline import-load signature for the same specific executable image.

13. The method of claim 1 wherein adjudicating the sample program as being benign or malicious based on at least results of the comparison further comprises:
adjudicating the sample program as being malicious, responsive to there being a difference between the import-load signature of the specific executable image when run by the sample program and the corresponding stored baseline import-load signature for the same specific executable image.

14. The method of claim 1 wherein adjudicating the sample program as being benign or malicious based on at least results of the comparison further comprises:
utilizing a plurality of evidentiary factors one of which is the results of the comparison in order to determine whether a suspiciousness threshold is met by the sample program.

15. The method of claim 1 further comprising:
analyzing code imported or loaded by the executable image when run by the sample program for maliciousness.

16. At least one non-transitory computer readable medium for detecting malicious code that modifies an in-memory process, based on deviations in executable image import resolutions and load patterns, the at least one non-transitory computer readable medium storing computer executable instructions that, when loaded into computer memory and executed by at least one processor of at least one computing device, cause the at least one computing device to perform the following steps:
running each one of a plurality of trusted executable images in a controlled environment;
generating a baseline import-load signature of each one of the plurality of trusted executable images when run in the controlled environment, wherein a baseline import-load signature of a specific trusted executable image comprises a unique binary signature of a resolution of importing external code and loading external code libraries by the specific trusted executable image when run in the controlled environment;
storing the generated baseline import-load signatures;
running a sample program being tested for maliciousness in the controlled environment;
identifying the sample program running a specific executable image in the controlled environment;
generating an import-load signature of the specific executable image, wherein the import load signature of the specific executable image comprises a unique binary signature of a resolution of importing external code and loading external code libraries, by the specific executable image when run by the sample program;
comparing the import-load signature of the specific executable image when run by the sample program to a corresponding stored baseline import-load signature for the same specific executable image; and
adjudicating the sample program as being benign or malicious based on at least results of the comparison.

17. The at least one non-transitory computer readable medium of claim 16 wherein running a sample program being tested for maliciousness in the controlled environment further comprises:
running a plurality of sample programs in the controlled environment, and testing each specific one of the plurality of samples programs for maliciousness.

18. A computer system for detecting malicious code that modifies an in-memory process, based on deviations in executable image import resolutions and load patterns, the computer system comprising:
a processor;
system memory;
an executable image running module residing in the system memory, the executable image running module being programmed to run each one of a plurality of trusted executable images in a controlled environment;

a signature generating module residing in the system memory, the signature generating module being programmed to generate a baseline import-load signature of each one of the plurality of trusted executable images when run in the controlled environment, wherein a baseline import-load signature of a specific trusted executable image comprises a unique binary signature of a resolution of importing external code and loading external code libraries by the specific trusted executable image when run in the controlled environment;

a storing module residing in the system memory, the storing module being programmed to store the generated baseline import-load signatures;

a sample running module residing in the system memory, the sample running module being programmed to run a sample program being tested for maliciousness in the controlled environment;

an identifying module residing in the system memory, the identifying module being programmed to identify the sample program running a specific executable image in the controlled environment;

the signature generating module being further programmed to generate an import-load signature of the specific executable image, wherein the import load signature of the specific executable image comprises a unique binary signature of a resolution of importing external code and loading external code libraries, by the specific executable image when run by the sample program;

a comparing module residing in the system memory, the comparing module being programmed to compare the import-load signature of the specific executable image when run by the sample program to a corresponding stored baseline import-load signature for the same specific executable image; and an adjudicating module residing in the system memory, the adjudicating module being programmed adjudicate the sample program as being benign or malicious based on at least results of the comparison.

\* \* \* \* \*